United States Patent
Selvaraj et al.

(10) Patent No.: US 6,713,598 B2
(45) Date of Patent: Mar. 30, 2004

(54) METHOD TO MAKE A SOLID POLYMERIC PHOSPHATE AND RESINOUS COMPOSITIONS CONTAINING IT

(75) Inventors: Immanuel I. Selvaraj, Bangalore (IN); Gerrit de Wit, Ossendrecht (NL); Jan Gosens, Roosendaal (NL)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 10/229,836

(22) Filed: Aug. 28, 2002

(65) Prior Publication Data

US 2004/0044134 A1 Mar. 4, 2004

(51) Int. Cl.$^7$ .................. C08G 79/02; C08G 79/04
(52) U.S. Cl. .............. 528/398; 528/397; 528/400; 528/425; 528/480; 528/494; 528/495; 528/503
(58) Field of Search .................. 528/398, 397, 528/400, 425, 480, 474, 495, 503

(56) References Cited

U.S. PATENT DOCUMENTS

| | | |
|---|---|---|
| 2,616,873 A | 11/1952 | Cass |
| 2,636,876 A | 4/1953 | Zentfman et al. |
| 3,028,365 A | 4/1962 | Schnell et al. |
| 3,148,172 A | 9/1964 | Fox et al. |
| 3,271,367 A | 9/1966 | Schnell et al. |
| 3,271,368 A | 9/1966 | Goldberg et al. |
| 4,217,438 A | 8/1980 | Brunelle et al. |
| 4,481,338 A | 11/1984 | Serini et al. |
| 4,482,693 A | 11/1984 | Serini et al. |
| 5,728,859 A | 3/1998 | Bright et al. |
| 5,750,756 A | 5/1998 | Bright et al. |

FOREIGN PATENT DOCUMENTS

JP 2000-239544 9/2000

OTHER PUBLICATIONS

Ki–Soo Kim, "Phosphorus–Containing Polymers. I. Low Temperature Polycondensation of Phenylphosphonic Dichloride with Bisphenols", Journal of Applied Polymer Science, vol. 28, pp. 1119–1123, (1983).
Chapter 35—Noncondensed Aromatic Compounds, p. 5553, paragraphs c–e, E. Wieckowski, (1963).

Primary Examiner—Duc Truong

(57) ABSTRACT

Disclosed is a method for the preparation of polymeric phosphate flame retardants with a molecular weight of at least about 1500 and a softening temperature of at least about 10° C. comprising the steps of (a) reacting a phosphorus oxyhalide with a monohydroxyaromatic compound, (b) removing substantially all of any remaining phosphorus oxyhalide; (c) reacting the monoaryldichlorophosphate product with a dihydroxyaromatic compound and (d) reacting the product of step (c) with a monohydroxyaromatic compound. The solid polymeric flame retardant has a linear structure and less than 10 ppm halogen bound to phosphorus. Also disclosed are resinous compositions comprising the solid polymeric phosphate made by the method of the invention and at least one other polymeric resin.

36 Claims, No Drawings

METHOD TO MAKE A SOLID POLYMERIC PHOSPHATE AND RESINOUS COMPOSITIONS CONTAINING IT

BACKGROUND

The invention relates generally to a process for preparation of a solid polymeric phosphate with linear structure with a softening temperature of at least 10° C. and with less than 10 ppm halogen bound to phosphorus. The invention also relates to resinous compositions comprising said solid polymeric phosphate made by the method.

Polymeric phosphates have been reported. In particular, U.S. Pat. Nos. 2,616,873 and 2,636,876 teach preparation of polymeric phosphates through reaction of monoaryldichlorophosphates with a dihydroxy aromatic compound. However, both methods produce polymeric phosphates which contain residual chlorophosphate which is corrosive to processing equipment and limits the usefulness of the phosphate products. U.S. Pat. Nos. 4,481,338 and 4,482,693 teach preparation of a limited number of polymeric phosphates and their use in resinous compositions. However, the polymeric phosphates taught therein are branched resins and may also contain residual chlorophosphate due to the absence of a final chain-capping step. There is a need for a solid polymeric phosphate flame retardant since solids eliminate the use of liquid handling equipment required for many phosphate flame-retardants during blending operations. More particularly, there is a need for a process which unequivocally leads to linear, solid polymeric phosphate with no possibility of residual halogen-phosphorus linkages which result in corrosion of common resin processing equipment. The present method addresses such a need.

BRIEF DESCRIPTION

In various embodiments the present invention comprises a method for the preparation of a solid polymeric phosphate with a molecular weight of at least about 1500 and a softening temperature of at least about 10° C. comprising the steps of (a) reacting a phosphorus oxyhalide with a monohydroxyaromatic compound to form a monoaryldihalophosphate; (b) removing substantially all of any remaining phosphorus oxyhalide; (c) reacting the monoaryldichlorophosphate product with a dihydroxyaromatic compound; and, (d) reacting the product of step (c) with a monohydroxyaromatic compound wherein the polymer thus formed is a solid with a linear structure and with less than 10 ppm halogen bound to phosphorus.

DETAILED DESCRIPTION

In various embodiments, a solid polymeric phosphate can be prepared by a multi-step process. In the first step, a phosphorus oxyhalide is reacted with a monohydroxyaromatic compound to form a monoaryldihalophosphate. The phosphorus oxyhalide comprises at least one of phosphorus oxychloride or phosphorus oxybromide. In a particular embodiment, the phosphorus oxyhalide comprises phosphorus oxychloride. The amount of phosphorus oxyhalide required can range from about 1 to about 5 times the amount that is stoichiometrically required to complete the reaction with the monohydroxyaromatic compound. In various embodiments, the molar ratio of phosphorus oxyhalide to monohydroxyaromatic compound which can be used in the present method can in one embodiment be about 1:1, in another embodiment about 2:1, in another embodiment about 3:1, in another embodiment about 4:1, and in still another embodiment about 5:1. In some embodiments, the molar ratio of phosphorus oxyhalide to monohydroxyaromatic compound is greater than about 1:1.

Suitable monohydroxyaromatic compounds comprise those derived from monocyclic or polycyclic aromatic moieties, which may be substituted or unsubstituted. In one embodiment a monocyclic aromatic moiety comprises phenyl. Polycyclic aromatic moieties which may serve as the source of monohydroxyaromatic compounds include fused ring species such as naphthalene and monocyclic aromatic moieties linked by a covalent bond, as for example in biphenyl, or linked by at least one linking atom, such as alkylene, alkylidene, carbonyl, oxygen, nitrogen, sulfur, sulfoxide, sulfone, phosphorus or silicon. In various embodiments, substituents on monohydroxyaromatic compounds, when present, include at least one $C_1$–$C_{30}$ alkyl, which may be normal, branched, cyclic, or bicyclic, or at least one halogen group. In particular embodiments monohydroxyaromatic compounds that can be used include phenol, ortho-cresol, meta-cresol, para-cresol, xylenol, 2,6-xylenol, 2,4-xylenol, 2,3-xylenol, 2,5-xylenol, 3,4-xylenol, 3,5-xylenol, 2-bromophenol, 3-bromophenol, 4-bromophenol, 2,3-dibromophenol, 2,6-dibromophenol, 2,4-dibromophenol, 2-chlorophenol, 3-chlorophenol, 4-chlorophenol, 2,6-dichlorophenol, 2,4-dichlorophenol, 2,3-dichlorophenol, 2,5-dichlorophenol, 3,4-dichlorophenol, and 3,5-dichlorophenol. Monohydroxyaromatic compounds with at least one alkyl substituent and at least one halogen substituent are also suitable.

In various embodiments the reaction is performed at a temperature suitable for the monohydroxyaromatic compound to react with the phosphorus oxyhalide. In some embodiments monohydroxyaromatic compounds with ortho substituents may require a higher temperature than those with para or meta substituents. In particular embodiments the temperature range for reacting monohydroxyaromatic compound with phosphorus oxyhalide is between about 100° C. and 200° C. In various embodiments, the reaction temperature may be held in the desired range for a sufficient period of time such that essentially all the monohydroxyaromatic compound in the reaction mixture has reacted. Analytical methods for monitoring the concentration of monohydroxyaromatic compound in the reaction mixture are well known to those skilled in the art, and may be applied as appropriate depending upon the degree of accuracy desired. Reaction of essentially all the monohydroxyaromatic compound in the present context means that in one embodiment, greater than about 95 mole % of the monohydroxyaromatic compound has reacted; in another embodiment, greater than about 98 mole % of the monohydroxyaromatic compound has reacted; and in another embodiment, greater than about 99 mole % of the monohydroxyaromatic compound has reacted. In a particular embodiment, reaction of essentially all the monohydroxyaromatic compound in the present context means that none can be detected using the chosen analytical method. In some embodiments, the reaction temperature may be held essentially constant in the desired range for the necessary period of time. One of average skill in the art should recognize that the time and temperature of the first step may vary with such factors as the substituent in the monohydroxyaromatic compound and also on the type and amount of phosphorus oxyhalide used, among other factors. In some particular embodiments, the monohydroxyaromatic compound is added slowly to the phosphorus oxyhalide. A slow addition tends to minimize formation of triaryl phosphates. The time of addition of monohydroxyaromatic compound to phosphorus oxyhalide is in some particular embodiments greater than about 1 hour, in other particular embodiments greater than about 2 hours, in still other particular embodiments greater than about 3 hours, and in still other particular embodiments greater than about 5 hours. In another embodiment the time of addition of monohydroxyaromatic compound to phosphorus oxyhalide is in a range of between about 1 hour and the total time required for essentially all of the monohydroxyaromatic compound to react with the phosphorus oxyhalide. In still another particular embodiment the time of addition of monohydroxyaromatic compound to phosphorus oxyhalide is in a range of between about 1 hour and about 15 hours. In other particular embodiments, all of the phosphorus oxyhalide is added in one batch. The total reaction time of the monohydroxyaromatic compound with the phosphorus oxyhalide is in some particular embodiments greater than about 1 hour, in other particular embodiments greater than about 2 hours, in still other particular embodiments greater than about 3 hours, and in still other particular embodiments greater than about 5 hours. In another particular embodiment, the total reaction time of monohydroxyaromatic compound with phosphorus oxyhalide is in a range of between about 1 hour and about 18 hours. In still another particular embodiment, the total reaction time of monohydroxyaromatic compound with phosphorus oxyhalide is in a range of between about 10 hours and about 16 hours. In various embodiments, the acidic components of the reaction may be removed by bubbling these into alkaline solutions.

At the desired end of the reaction, any remaining phosphorus oxyhalide is removed by some known process such as distillation. The product residue (sometimes referred to hereinafter as the product from the first reaction or first reaction product) may be kept in the same reaction vessel or, if desired, the product residue may be recovered using standard methods which may include one or more steps of filtration, dissolution, in a solvent, solvent extraction, distillation to remove reaction products other than monoaryldihalophosphate, and like methods.

In a second step of the present method, the product of the first reaction is reacted with at least one dihydroxyaromatic compound. The reaction may be conducted by any convenient means. In some embodiments the reaction is conducted in solution, while in other embodiments the reaction is conducted in the melt in the absence of solvent. At least one acid acceptor or at least one catalyst, or a combination of acid acceptor and catalyst may be present in some embodiments of the second step of the method.

In one particular embodiment the product of the first reaction is taken in a suitable organic solvent, the solvent being in sufficient quantity as to substantially dissolve said product. In an alternative embodiment, a purified monoaryldihalophosphate is employed with the organic solvent, said purified material being substantially free of triaromatic phosphate and monohalo-diaromatic phosphate, substantially free in the present context meaning that the monoaryldihalophosphate is greater than about 94% pure. Suitable solvents include, but are not limited to, ethers such as diethyl ether, diisopropyl ether, dibutyl ether, anisole, and tetrahydrofuran; ketones such as acetone and methyl ethyl ketone, chlorinated hydrocarbons such as methylene chloride and trichloroethylene, alcohols, diols and other solvents in which the reactants are sufficiently soluble.

In one embodiment, the organic solution of the first reaction product or its purified equivalent is added drop wise to a solution of a dihydroxyaromatic compound and at least one acid acceptor. In some embodiments, either or both of dihydroxyaromatic compound and acid acceptor are dissolved in an organic solvent. In particular embodiments, both dihydroxyaromatic compound and acid acceptor are dissolved in the same organic solvent as used to substantially dissolve the product of the first reaction or its purified equivalent. Suitable acid acceptors include, but are not limited to, amines such as tertiary amines including triethylamine, dimethylbutylamine, diisopropylethylamine, 2,2,6,6-tetramethylpiperidine; N-$C_1$–$C_6$-alkyl-pyrrolidines, such as N-ethylpyrrolidine; N-$C_1$–$C_6$-piperidines, such as N-ethylpiperidine, N-methylpiperidine, and N-isopropylpiperidine; N-$C_1$–$C_6$-morpholines, such as N-ethylmorpholine and N-isopropyl-morpholine; N-$C_1$–$C_6$-dihydroindoles; N-$C_1$–$C_6$-dihydroisoindoles; N-$C_1$–$C_6$-tetrahydroquinolines; N-$C_1$–$C_6$-tetrahydroisoquinolines; N-$C_1$–$C_6$-benzo-morpholines; 1-azabicyclo-[3.3.0]-octane; quinuclidine; N-$C_1$–$C_6$-alkyl-2-azabicyclo-[2.2.1]-octanes; N-$C_1$–$C_6$-alkyl-2-azabicyclo-[3.3.1]-nonanes; N-$C_1$–$C_6$-alkyl-3-azabicyclo-[3.3.1]-nonanes; N,N,N',N'-tetraalkylalkylene-diamines, including N,N,N',N'-tetraethyl-1,6-hexanediamine; alkanolamines, ethanolamine, and diethanolamine, and mixtures thereof. In various embodiments tertiary amines include at least one of triethylamine, dimethylbutylamine, diisopropylethylamine, or 2,2,6,6-tetramethylpiperidine.

The temperature range for reaction in the second step of the process in various embodiments is in a range of between about 20° C. and about 150° C., and in other embodiments in a range of between about 25° C. and about 50° C. In various embodiments, the reaction temperature may be held in the desired range for a period of lime sufficient for essentially all the dihydroxyaromatic compound to have reacted. Analytical methods for monitoring the concentration of dihydroxyaromatic compound in the reaction mixture are well-known to those skilled in the art and may be applied as appropriate depending upon the degree of accuracy desired. Reaction of essentially all the dihydroxyaromatic compound in the present context means that in one embodiment greater than about 95 mole % of the dihydroxyaromatic compound has reacted, in another embodiment greater than about 98 mole % of the dihydroxyaromatic compound has reacted, and in another embodiment greater than about 99 mole % of the dihydroxyaromatic compound has reacted. In a particular embodiment, reaction of essentially all the dihydroxyaromatic compound means that none can be detected using the chosen analytical method. In some embodiments, the reaction temperature may be held essentially constant in the desired range for the necessary period of time. One of average skill in the art should recognize that the time and temperature of the second reaction may vary with such factors as the substituents in the dihydroxyaromatic compound and also on the type and amount of product from the first reaction (or its purified equivalent) and the type and amount of acid acceptor, among other factors. The time of addition of organic solution of the first reaction product (or its purified equivalent) to the dihydroxyaromatic compound is in some particular embodiments greater than about 0.5 hours, in other particular embodiments greater than about 1 hour, in still other particular embodiments greater than about 2 hours, and in still other particular embodiments greater than about 3 hours. In another particular embodiment, the time of addition of organic solution of the first reaction product (or its purified equivalent) to the dihydroxyaromatic compound is in a range of between about 0.5 hours and the total reaction time. In still another particular embodiment, the time of addition of organic solution of the first reaction product (or its purified equivalent) to dihydroxyaromatic compound is in a range of between about 0.5 hours and about 6 hours. In still another particular embodiment, the time of addition of organic solution of the first reaction product (or its purified equivalent) to dihydroxyaromatic compound is in a range of between about 0.5 hours and about 5 hours. The total reaction time of first reaction product (or its purified equivalent) with dihydroxyaromatic compound is, in some particular embodiments, greater than about 0.5 hours, in other particular embodiments greater than about 1 hour, in still other particular embodiments greater than about 2 hours, in still other particular embodiments greater than about 3 hours, in still other particular embodiments greater than about 4 hours, in still other particular embodiments greater than about 5 hours, and in still other particular embodiments greater than about 6 hours. In another particular embodiment, the total reaction time of first reaction product (or its purified equivalent) with dihydroxyaromatic compound is in a range of between about 1 hour and about 7 hours. In still another particular embodiment, the total reaction time of first reaction product (or its purified equivalent) with dihydroxyaromatic compound is in a range of between about 1 hour and about 6 hours. In some particular embodiments, a solid which comprises the desired linear, solid polymeric phosphate precipitates from the reaction mixture during the course of the reaction.

In embodiments of the present method, the reaction mixture following complete addition of organic solution of the first reaction product (or its purified equivalent) to a solution comprising a dihydroxyaromatic compound is treated with a monohydroxyaromatic compound to serve as a chain-stopper for the polymer product. Suitable monohydroxyaromatic chain-stoppers include those monohydroxyaromatic compounds disclosed hereinabove. Additional acid acceptor may be added before, simultaneous with, or after said addition of monohydroxyaromatic chain-stopper. The amount of added chain-stopper may be readily calculated by those skilled in the art to provide any desired degree of chain-stopped polymer of any desired molecular weight.

Catalysts may be used in any step of the reaction to make solid polymeric phosphate with linear structure. Suitable catalysts include all those known to facilitate reaction of phosphorus halide with aromatic hydroxy compounds. Illustrative catalysts include, but are not limited to, aluminum chloride, magnesium chloride, boron trifluoride, zinc chloride, metallic tin, and calcium chloride.

At the desired end of the reaction to make solid polymeric phosphate with linear structure, the product may be recovered using standard methods which may include one or more steps of decantation, dissolution in a solvent, solvent extraction, removal of water, drying, precipitation into an antisolvent, trituration with water or an organic solvent or both water and an organic solvent, filtration, distillation, and like methods.

In embodiments of the present invention dihydroxyaromatic compounds that may be used include those described in U.S. Pat. Nos. 3,028,365, 2,999,835, 3,148,172, 3,271,368, 2,991,273, and 3,271,367.

Suitable dihydroxyaromatic compounds include those represented by the formula (I):

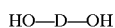
(I)

wherein D is a divalent aromatic radical. In some embodiments, D has the structure of formula (II):

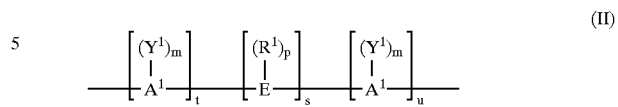
(II)

wherein $A^1$ represents an aromatic group such as phenylene, biphenylene, naphthylene, etc. E may be an alkylene or alkylidene group such as methylene, ethylene, ethylidene, propylene, propylidene, isopropylidene, butylene, butylidene, isobutylidene, amylene, amylidene, isoamylidene, etc. Where E is an alkylene or alkylidene group, it may also consist of two or more alkylene or alkylidene groups connected by a moiety different from alkylene or alkylidene, such as an aromatic linkage; a tertiary amino linkage; an ether linkage; a carbonyl linkage; a silicon-containing linkage; or a sulfur-containing linkage such as sulfide, sulfoxide, sulfone, etc.; or a phosphorus-containing linkage such as phosphinyl, phosphonyl, etc. In addition, E may be a cycloaliphatic group e.g., cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene, etc.; a sulfur-containing linkage, such as sulfide, sulfoxide or sulfone; a phosphorus-containing linkage, such as phosphinyl, phosphonyl; an ether linkage; a carbonyl group; a tertiary nitrogen group; or a silicon-containing linkage such as silane or siloxy. $R^1$ represents hydrogen or a monovalent hydrocarbon group such as alkyl, aryl, aralkyl, alkaryl, or cycloalkyl. $Y^1$ may be an inorganic atom such as halogen (fluorine, bromine, chlorine, iodine); an inorganic group such as nitro; an organic group such as alkenyl, allyl, or $R^1$ above, or an oxy group such as OR wherein R is an alkyl group; it being only necessary that $Y^1$ be inert to and unaffected by the reactants and reaction conditions used to prepare the polymeric phosphate. The letter "m" represents any integer from and including zero through the number of positions on $A^1$ available for substitution; "p" represents an integer from and including zero through the number of positions on E available for substitution; "t" represents an integer equal to at least one; "s" is either zero or one; and "u" represents any integer including zero.

In the dihydroxyaromatic compound in which D is represented by formula (II) above, when more than one Y substituent is present, they may be the same or different. The same holds true for the $R^1$ substituent. Where "s" is zero in formula (II) and "u" is not zero, the aromatic rings are directly joined with no intervening alkylidene or other bridge. The positions of the hydroxyl groups and $Y^1$ on the aromatic nuclear residues $A^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some particular embodiments the parameters "t", "s", and "u" are each one; both $A^1$ radicals are unsubstituted phenylene radicals; and E is an alkylidene group such as isopropylidene. In some particular embodiments both $A^1$ radicals are p-phenylene, although both may be o- or m-phenylene or one o- or m-phenylene and the other p-phenylene.

In some embodiments dihydroxyaromatic compounds are of the formulae:

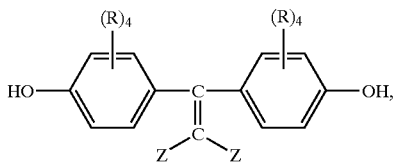

where independently each R is hydrogen, chlorine, bromine or a $C_{1-30}$ monovalent hydrocarbon or hydrocarbonoxy group, each Z is hydrogen, chlorine or bromine, subject to the proviso that at least one Z is chlorine or bromine, and

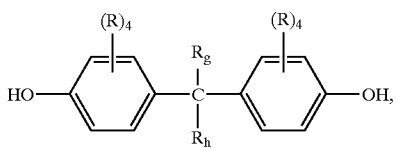

where independently each R is as defined hereinbefore, and independently $R_g$ and $R_h$ are hydrogen or a $C_{1-30}$ monovalent hydrocarbon group.

Some illustrative, non-limiting examples of dihydroxyaromatic compounds of formula (II) include the dihydroxyaromatic compounds disclosed by name or formula (generic or specific) in U.S. Pat. No. 4,217,438. Some particular examples of dihydroxyaromatic compounds include 4,4'-(3,3,5-trimethyl-cyclohexylidene)-diphenol; 4,4'-bis(3,5-dimethyl)diphenol, 1,1-bis(4-hydroxy-3-methylphenyl)cyclohexane; 4,4-bis(4-hydroxyphenyl) heptane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl) ethane; 2,2-bis(4-hydroxyphenyl)propane (commonly known as bisphenol A); 2,2-bis(3-phenyl-4-hydroxyphenyl) propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl) cyclohexylmethane; 2,2-bis(4-hydroxyphenyl)-1-phenylpropane; 2,4'-dihydroxyphenyl sulfone; 2,6-dihydroxy naphthalene; hydroquinone; resorcinol; $C_{1-3}$ alkyl-substituted resorcinols.

Other particular examples of dihydroxyaromatic compounds include: 2,2-bis-(4-hydroxyphenyl)-butane; 2,2-bis-(4-hydroxyphenyl)-2-methylbutane; 1,1-bis-(4-hydroxyphenyl)-cyclohexane; bis-(4-hydroxyphenyl); bis-(4-hydroxyphenyl)-sulphide; 2-(3-methyl-4-hydroxyphenyl-2-(4-hydroxyphenyl)-propane; 2-(3,5-dimethyl-4-hydroxyphenyl)-2-(4-hydroxyphenyl)-propane; 2-(3-methyl-4-hydroxyphenyl)-2-(3,5-dimethyl-4-hydroxyphenyl)-propane; bis-(3,5-dimethylphenyl-4-hydroxyphenyl)methane; 1,1-bis-(3,5-dimethylphenyl-4-hydroxyphenyl)ethane; 2,2-bis-(3,5-dimethylphenyl-4-hydroxyphenyl)propane; 2,4-bis-(3,5-dimethylphenyl-4-hydroxyphenyl)-2-methylbutane; 3,3-bis-(3,5-dimethylphenyl-4-hydroxyphenyl)pentane; 1,1-bis-(3,5-dimethylphenyl-4-hydroxyphenyl)cyclopentane; 1,1-bis-(3,5-dimethylphenyl-4-hydroxyphenyl)cyclohexane; bis-(3,5-dimethylphenyl-4-hydroxyphenyl)-sulphide.

Suitable dihydroxyaromatic compounds also include those containing indane structural units such as represented by the formula (III), which compound is 3-(4-hydroxyphenyl)-1,1,3-trimethylindan-5-ol, and by the formula (IV), which compound is 1-(4-hydroxyphenyl)-1,3,3-trimethylindan-5-ol:

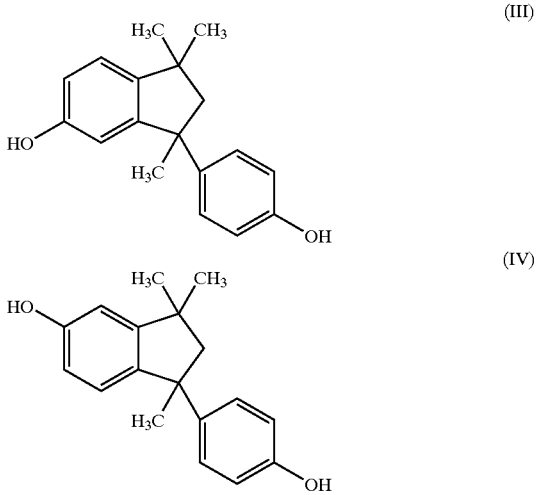

Also included among suitable dihydroxyaromatic compounds are the 2,2,2',2'-tetrahydro-1,1'-spirobi[1H-indene] diols having formula (V):

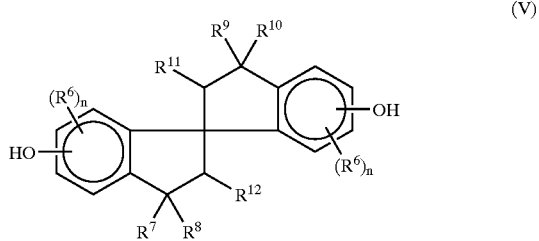

wherein each $R^6$ is independently selected from monovalent hydrocarbon radicals and halogen radicals; each $R^7$, $R^8$, $R^9$, and $R^{10}$ is independently $C_{1-6}$ alkyl; each $R^{11}$ and $R^{12}$ is independently H or $C_{1-6}$ alkyl; and each n is independently selected from positive integers having a value of from 0 to 3 inclusive. In a particular embodiment the 2,2,2',2'-tetrahydro-1,1'-spirobi[1H-indene]diol is 2,2,2',2'-tetrahydro-3,3,3',3'-tetramethyl-1,1'-spirobi[1H-indene]-6,6'-diol (sometimes known as "SBI").

The term "alkyl" as used in the various embodiments of the present invention is intended to designate both normal alkyl, branched alkyl, aralkyl, cycloalkyl, and bicycloalkyl radicals. In various embodiments normal and branched alkyl radicals are those containing from 1 to about 30 carbon atoms, and include as illustrative non-limiting examples methyl, ethyl, n-propyl, isopropyl, n-butyl, sec-butyl, tertiary-butyl, pentyl, neopentyl, hexyl, heptyl, octyl, nonyl, decyl, undecyl and dodecyl. In various embodiments cycloalkyl radicals are those containing from 3 to about 12 ring carbon atoms. Some illustrative non-limiting examples of these cycloalkyl radicals include cyclobutyl, cyclopentyl, cyclohexyl, methylcyclohexyl, and cycloheptyl. In various embodiments aralkyl radicals are those containing from 7 to about 14 carbon atoms; these include, but are not limited to, benzyl, phenylbutyl, phenylpropyl, and phenylethyl. In various embodiments aryl radicals used in the various embodiments of the present invention are those containing from 6 to 18 ring carbon atoms. Some illustrative non-limiting examples of these aryl radicals include phenyl, biphenyl, and naphthyl.

Solid polymeric phosphates made by the present method comprise polymeric units of the formula:

(VI)

wherein n is greater than or equal to 2, Ar is a residue derived from a monohydroxyaromatic compound, and wherein Y is derived from a dihydroxyaromatic compound as described hereinabove. In one particular embodiment solid polymeric phosphates made by the present method comprise those of the formula

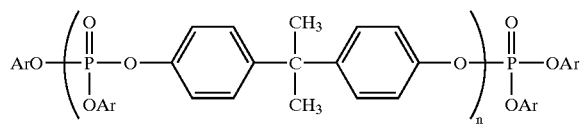

wherein n is an integer greater than or equal to about 2; and each Ar is independently a residue derived from a monohydroxyaromatic compound.

In another particular embodiment solid polymeric phosphates made by the present method comprise those of the formula

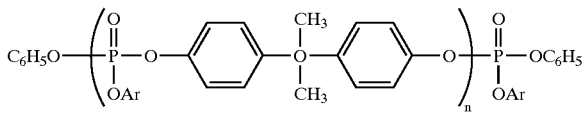

wherein n is an integer greater than or equal to about 2; and Ar is a residue derived from a monohydroxyarornatic compound.

The type of reactor used to perform the reaction steps of the present invention is not particularly critical. In one embodiment the process according to the present method may be carried out in conventional steel reactors since no corrosion problems occur. The solid polymeric phosphate has a softening temperature of at least 10° C. and has a molecular weight Mw (measured by gel-permcation chromatography with polystyrene as standard) of at least about 1500. The average polycondensation degree (the parameter n in the polymer of formula VI) of the solid polymeric phosphate is at least 2 based on phosphate groups in the solid polymer, and is generally between 2 and 30. In various embodiments, the solid polymeric phosphate product comprises a linear polymer. The linear polymer arises through the removal of substantially all phosphorus oxyhalide starting material remaining in the first step of the process of the invention.

Another embodiment of the invention is a resinous composition comprising the solid polymeric phosphate made by the method of the invention and at least one other polymeric resin. The solid polymeric phosphate of the present method can be used as an additive in blends with a wide variety of polymeric resins, including thermoplastic resins, such as addition polymers and condensation polymers, and thermoset resins. In various embodiments the solid polymeric phosphate can be easily blended with polycarbonates, acrylonitrile-butadiene-styrene (ABS), and with polyphenylene ethers, such as poly(2,6-dimethyl-1,4-phenylene ether) or poly(2,6-dimethyl-co-2,3,6-trimethyl-1,4-phenylene ether) or blends comprising polyphenylene ethers and especially blends with high impact polystyrene (HIPS). Other polymeric resins in which the solid polymeric phosphate is useful as an additive include polyurethane, polyesters, polyacrylates, homo- and copolymers of styrene and derivatives thereof with acrylic and methacrylic compounds, or with maleic anhydride or fumaric acid, and in poly(vinyl chloride) and rubber-modified variants thereof. Such homo- and copolymers of styrene and derivatives thereof include for example, polystyrene, styrene-acrylonitrile copolymers, methyl acrylate-acrylonitrile copolymer, styrene-methacrylate copolymers, styrene-acrylate copolymers, styrene-methyl methacrylate copolymer, styrene-acrylonitrile copolymer and styrene-methyl methacrylate-acrylonitrile copolymer Examples of rubber-modified variants of polymers are ABS and HIPS. Other suitable polymeric resins include polyimides, polyamides, polyamideimides, polyetherimides, polyetherketones, aromatic polycarbonates, polysulfides, polyethers, polysulphones, polyethersulphones, and in particular, polyarylene ethers, polyetherimides and mixtures thereof with homo- and/or copolymers of styrene and rubber-modified polystyrene and HIPS.

Polyesters are illustrated by poly(alkylene dicarboxylates), especially poly(ethylene terephthalate), poly(1,4-butylene terephthalate), poly(trimethylene terephthalate), poly(ethylene naphthalate), poly(butylene naphthalate), poly(cyclohexanedimethanol terephthalate), poly(cyclohexanedimethanol-co-ethylene terephthalate), and poly(1,4-cyclohexanedimethyl-1,4-cyclohexanedicarboxylate), and especially poly(alkylene arenedioates), with poly(ethylene terephthalate) and poly(1, 4-butylene terephthalate) being employed in some particular embodiments.

In other embodiments the invention encompasses resinous compositions comprising the solid polymeric phosphate made by the method of the invention and blends of polymers and/or copolymers comprising at least two other polymers. Said at least two other polymers may comprise miscible, immiscible, and compatibilized blends including, but not limited to, polycarbonate/ABS, polycarbonate/ASA, polycarbonate/poly(butylene terephthalate), polycarbonate/poly(ethylene terephthalate), polycarbonate/polyetherimide, polyester/polyetherimide, polyphenylene ether/polystyrene, polyphenylene ether/polyamide, and polyphenylene ether/polyester.

In further embodiments of the present method, the use of the solid polymeric phosphate in compounded formulations comprising polymeric resins does not lead to corrosion in processing machines, such as for example, extruders, rollers, kneaders, and molds. Corrosion is also avoided in contact with metal parts, such as for example in electronic circuitry. Furthermore, the solid polymeric phosphate, which is obtained by the present method, is substantially free of any species containing radicals of halogen bound to phosphorus. Such species can also result in corrosion during processing, especially at elevated temperatures. Radicals of halogen bound to phosphorus may be detected using methods know to those skilled in the art. In one embodiment radicals of halogen bound to phosphorus may be detected using $^{31}P$ NMR spectroscopy. In the present context substantially free of radicals of halogen bound to phosphorus means that in one embodiment, less than about 500 ppm of such species can be detected; in another embodiment, less than about 100 ppm of such species can be detected; in another embodiment, less than about 50 ppm of such species can be detected; in another embodiment, less than about 20 ppm of such species can be detected, and in another embodiment, less than about 10 ppm of such species can be detected. In a particular embodiment, substantially free of radicals of halogen bound to phosphorus means that none can be detected using the chosen analytical method.

The use of the solid polymeric phosphate of the present method also eliminates decomposition problems that occur during polymer processing. Compared to other lower molecular weight additives, the solid polymeric phosphate also exhibits little or no migration to the surface of molded parts during manufacture of blends with polymeric resins or when the blend is heated to an elevated temperature. The solid polymeric phosphate can be handled as a solid up to its softening temperature and will be a viscous liquid above it. With a softening temperature of at least 10° C. the solid polymeric phosphate can be fed during a compounding process with other polymeric resins and optional additives as a solid into standard polymer processing equipment such as a compounder, while it may plasticize/melt during the compounding process upon mixing with the other blend components at elevated temperature. The solid polymeric phosphate of the present method has high thermal stability. It can be processed at relatively low temperatures due to its low melt viscosity.

The solid polymeric phosphate made by the present method causes an increase in flame resistance and in many embodiments also an increase in flowability, even when added in small quantities to other polymeric resins. The solid polymeric phosphate may be admixed with thermoset monomers before hardening, for example phenolic resins, polyurethane resins, melamine resins, epoxy resins, unsaturated polyester resins and other crosslinkable monomers. The solid polymeric phosphate is flame-resistant and exhibits good adhesion to various materials such as glass, metal and wood. The solid polymeric phosphates with values for halogen bound to phosphorus in the ranges given in the present invention when blended with thermoplastic polyesters such as polyethylene terephthalate do not lead to a deterioration in values of physical properties of the blends, which display exceptional physical stability. This may be reflected in the values of such physical properties as flexural modulus, flexural elongation percentage as well as heat deflection temperatures and impact-unnotched-Izod values (IUI). This is an important advantage since it often has been found using other flame retardant additives in the art that while attaining a desired property in a polymer by blending, the original strength and physical properties are reduced.

The solid polymeric phosphate of the present method may be used for a number of purposes, for example, as a stabilizer, plasticizer, lubricant, or flame proofing additive, in admixture with thermo-set resins and thermoplastic resins. It may be also used in adhesives and as cements and in coatings or moldings due to their adhesion properties and their flame resistance, low viscosity and their hydrolytic stability.

The solid polymeric phosphate of the present method in blends with other polymeric resins can be used wherever resinous material of high flame resistance is required. Such fields of application include, for example, the electrical and electronics industry, the motor vehicle industry, the aircraft industry, aerospace industry and safety industry. A variety of additives, such as antistatic agents, pigments, release agents, thermal stabilizers, UV light stabilizers, additional flame retardants such as melamine compounds, metal carbonates or hydroxides, boron compounds, and other phosphonis compounds, fillers such as talc, mineral wool, mica, calcium carbonate, and dolomite, as well as other reinforcing fillers, such as glass fibers, glass pellets, and asbestos can be added to the polymer blend compositions containing the solid polymeric phosphate of the present invention.

The solid polymeric phosphate can be in the form of flakes or needles and can be in the form of spheres of sizes varying from 1 to 100 microns in diameter or even smaller or may be a powder comprising randomly shaped particles of widely varying sizes.

In another embodiment, the present invention comprises methods for making the flame retardant compositions comprising solid polymeric phosphate and at least one polymeric resin. The flame retardant resinous compositions of the present invention may be made by combining and mixing the components of the composition under conditions suitable for the formation of a blend of the components, such as for example, by melt mixing using, for example, a two-roll mill, a Banbury mixer or a single screw or twin-screw extruder, and, optionally, then reducing the composition so formed to particulate form, e.g., by pelletizing or grinding the composition. In one embodiment the components of the composition are dry-blended before melt-mixing. In another embodiment one or more of the components of the composition are fed to an appropriate melt-mixing device. In a particular embodiment one or more of the components of the composition are fed to the feed throat of an extruder. In other embodiments, one or more of the components of the composition are fed to an appropriate melt-mixing device in batch mode. In another particular embodiment one or more of the components of the composition are fed to the feed throat of an extruder and one or more components are fed to a down-stream feed-port of the extruder. An extrusion process may be vacuum-vented at an appropriate barrel segment. The resin compositions of the present invention can be molded into useful shaped articles by a variety of means such as injection molding, extrusion, rotational molding, blow molding and thermoforming to form articles such as, for example, computer and business machine housings, automotive parts, and home appliances.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

$^1$H, $^{13}$C, and $^{31}$P NMR spectra were obtained on a 300 MHz or a 400 MHz instrument using $CDCl_3$ as solvent Chemical-shift values were reported in ppm relative to TMS for proton and carbon and relative to 85% $H_3PO_4$ for phosphorus. Infrared Spectra were recorded on a Micro FTIR instrument. The samples were made as KBr discs. Thermogravimetric analysis (TGA) data were collected under nitrogen atmosphere at a heating rate of 10° C./min. Differential scanning calorimetry (DSC) experiments were also run under nitrogen and with 10° C./min heating rate Gel permeation chromatography data were obtained from HP Agilent 1100 series instrument using PL Gel Mixed Type D (300×7.5 mm), 5 μm diameter column and a guard column with 5 μm diameter (Polymer labs). The mobile phase was HPLC Grade dichloromethane solvent with 20 μl of toluene used as a flow marker. The flow rate was 0.75 ml/min and the detector wavelength was 254 nm. Polystyrene samples were used as standard for the calibration. The flammability of test specimen was evaluated according to the standard UL-94 protocol. Ratings of V0 indicate test samples with the best resistance to burning, whereas V1 and V2 ratings in that order indicate a lower degree of resistance to burning. Izod impact value measurements of blends of phosphate and PET were performed on the Ceast impact tester using the ISO 180-93E method at a Hammer energy of 5.5J. Flexural modulus and percentage flexural elongation measurements were made on an Instron 5566 instrument using the ISO 527 method. Heat deflection measurements were made on a Ceast instrument at 1.8 Mpa using the ISO 179 method.

EXAMPLE 1

Phenol (1 mole; 94 grams (g)) and 2 moles (306 g) of phosphorus oxychloride were taken in a 1-liter round bottom flask with a cold water-circulated reflux condenser. The outlet of the condenser was connected to a funnel and immersed in KOH solution to dissolve evolved HCl. The mixture was stirred at 110° C.–120° C. for 14 hours. The reaction was monitored by $^{31}$P-NMR. Excess phosphorus oxyhalide was removed by distillation.

To a 2-liter round bottom flask was attached a mechanical stirrer, a reflux condenser and a stopper. The flask was charged with 201.1 g bisphenol A and 198 g triethylamine and 1 liter of diethylether, and the mixture was stirred at room temperature. While stirring was continued at room temperature, the product of the first step, which contained phenyldichlorophosphate, dichlorophenylphosphate, triphenyl phosphate; and phenol, was taken in 200 ml diethyl ether and added drop wise over a 70 minute period. The reaction mixture was further stirred for 30 minutes. A solid mass separated out and stirring was stopped.

The resulting mixture was kept overnight. Decanting the ether gave the solid, to which de-ionized water was added along with methylene chloride. After removing the water fraction containing the dissolved triethylamine hydrochloride, the methylene chloride solution was dried over anhydrous sodium sulphate. After filtering the sodium sulfate and stripping off the methylene chloride using a rotary evaporator, a resinous material was obtained. A minimum amount of methylene chloride was added to this residue and the resulting solution was poured into 3 liters of methanol to afford a white sticky precipitate. The methanol solution was decanted and the precipitate was dissolved in tnethylene chloride and once again precipitated into excess methanol. After decanting the methanol solution, de-ionized water was added which gave a white sticky solid. Vacuum drying this material at a temperature of 60° C. for about 6 hours using a vacuum oven gave the solid polymeric phosphate as a flaky white solid (305 g). The material was analyzed using the following techniques: 1H, $^{13}$C, and $^{31}$P NMR, IR, GPC and thermal analyses such as TGA and DSC.

COMPARATIVE EXAMPLE 1

A polymeric phosphate was made by reacting bisphenol A with phenyldichlorophosphate using the method of U.S. Pat. No. 2,636,876. The isolated product had 28% phosphorus bound to chlorine (relative to total phosphorus) as measured by $^{31}$P NMR spectroscopy.

EXAMPLE 2

To a stirred solution of tetrahydrofuran (THF) containing 4,4-isopropylidenediphenol (486.9 g, 2.13 moles) and triethylamine (430.8 g, 4.26 moles), phenyldichlorophosphate (500 g, 2.37 moles) was added drop wise over a period of 4 h. The solution was then stirred for another 2 h. To the resulting solution, 47.15 g (0.47 moles) of triethylamine and 44.6 g (0.47 moles) of phenol were added and the reaction mixture was stirred for 2 h. The reaction mixture was left overnight at room temperature with stirring. The solution was subjected to evaporation to remove excess THF, and the residual material was then poured into excess of distilled water to remove the triethylamine hydrochloride formed during the reaction. After removing water, the material was dissolved in minimum amount of THF and poured into water. The solution was then poured into excess of methanol. This procedure was repeated twice. Finally the resulting polymeric material was dried in a vacuum oven at 60° C. for 6 hours to give a white, crisp and flaky material (640 g, 82% yield based on the dihydroxyaromatic compound). The product was characterized by spectroscopic techniques such as $^1$H, $^{13}$C, and $^{31}$P NMR, IR, GPC, and by thermal analysis methods, such as TGA, DSC.

One difference in the above two examples was that in Example 1 equimolar amounts of bisphenol A and phenyldichlorophosphate were taken in the second step whereas in Example 2, 0.1 equivalent more of phenyldichlorophosphate was taken compared to bisphenol A and 0.2 equivalent of phenol and triethylamine were added later so that the endcapping would be a phosphate moiety.

EXAMPLE 3

A blend of solid polymeric phosphate derived from bisphenol A was blended with poly-(ethylene terephthalate) (0.8 IV). A comparative example was prepared using liquid bisphenol-A tetraphenylphosphate. The blends further comprised polytetrafluoroethylene added as a 50 wt % concentrate in styrene-acrylonitrile copolymer (SAN) to provide 0.2 wt % polytetrafluoroethylene based on the total weight of the composition. Both of the blends also contained 0.15 wt % of thermal-stabilizers which are not believed to affect the flame resistance properties. Following melt compounding, pellets of the blends were molded into test parts and tested for flame resistance. Test parts were also examined for migration of flame retardant to the surface after oven-aging at 150° C. for 1 week. Test results are shown in Table 1.

TABLE 1

| Component | Comparative Example | Example 3 |
| --- | --- | --- |
| PET | 44.95 | 44.95 |
| Glass-fiber | 30 | 30 |
| Melamine cyanurate | 8.5 | 8.5 |
| BPA-DP (liquid) | 16 | — |
| BPA-phosphate (solid) | — | 16 |
| Need of liquid injector system | Yes | No |
| UL94 at 1.6 mm | V0 | V0 |
| Migration of BPA-phosphate during molding | Yes | No |
| Migration of BPA-phosphate to surface upon oven aging of molded parts at 150 for 1 week | Yes | No |

TABLE 2

| Properties | PET with BPA-Phosphate (using material from Example 1) | PET with BPA-Phosphate (using material from Example 2) |
| --- | --- | --- |
| Flex Modulus, GPa | 9.71 | 12.21 |
| Flex Elongation, % | 1 | 1.43 |
| HDT (1.8 Mpa), ° C. | 98 | 203 |
| IUI, kJm$^{-2}$ | 7.1 | 21.3 |

EXAMPLE 4

Solid polymeric phosphate samples were made using the methods of examples 1 and 2 and subsequently blended with polyethylene terephthalate, and molded test parts of the blends were subjected to physical property measurements (blends contained 16% solid polymeric phosphate). Thus, flexural modulus, percentage elongation, Izod impact and heat deflection temperature measurements were made on blends made with solid polymeric phosphate without phenol endcap (example 1) and with phenol endcap (example 2). The results are given in Table 2 and indicate superior properties of the blends made with the solid polymeric phosphate of example-2.

EXAMPLE 5

97.49 g (0.43 mol) of BPA, 100.00 g (0.47 mol) of phenyldichlorophosphate, and 0.89 g (6.66 mmol) of aluminum chloride were taken in a reaction kettle. The kettle was fitted with an overhead stirrer, a water condenser with nitrogen outlet and a nitrogen inlet. The nitrogen outlet was immersed in a beaker containing KOH solution to absorb the evolved HCl. The reaction mixture was stirred-at 90° C. for 2 h and further at 120° C. for 4 h. A sample of the reaction mixture was drawn and $^{31}$P NMR was done to show that there was no phenyldichlorophosphate left and the conversion was nearly 75%. To the reaction mixture 26.06 g (0.28 mol) of phenol was added and the temperature was increased to 140° C. and the reaction mixture was stirred at that temperature for 3 h. After confirming from the $^{31}$P NMR spectrum that there was no reactive P—Cl bonds, the reaction mixture was cooled down to room temperature and dissolved in minimum amount of methylene chloride. The methylene chloride solution was added slowly into an excess amount of methanol. The methanol solution was decanted and the precipitate was again dissolved in a minimum amount of methylene chloride and poured into excess methanol. After decanting the methanol solution the precipitate was dried in a vacuum oven at 60–80° C. for 6 h to give 135 g (yield, ~87%) of the desired solid poly(BPA-phosphate).

EXAMPLE 6

24.81 g (0.11 mol) of BPA, 25.00 g (0.12 mol) of phenyldichlorophosphate, and 0.22 g (1.64 mmol) of aluminum chloride were taken in a cylindrical glass reactor fitted with an overhead stirrer, a water condenser with nitrogen outlet and a nitrogen inlet. The nitrogen outlet was immersed in a beaker containing KOH solution to absorb the evolved HCl. The reaction mixture was stirred at 90° C. for 2 hours and further at 120° C. for 4 hours. A sample of the reaction mixture was drawn and $^{31}$P NMR spectrum was done to show that there was no phenyidichlorophosphate left; the conversion was nearly 75%. To the reaction mixture 4.49 g (0.05 mol) of phenol was added and the temperature was increased to 140° C. and stirred at that temperature for 4 hours. After confirming from the $^{31}$P NMR spectrum that there were no reactive P—Cl bonds, vacuum (0.01 mm Hg) was applied at 120° C. for 2 hours to remove excess phenol. The temperature was further increased to 140° C. and then to a maximum for 180° C. and the reaction mixture was held under vacuum for additional 4 hours. The reaction mixture was poured while it was in molten state onto aluminum foil to afford 36 g (yield ~91%) a straw yellow, transparent solid poly-(BPA-phosphate).

While only certain features of the invention have been illustrated and described herein, many modifications and changes will occur to those skilled in the art. It is, therefore, to be understood that the appended claims are intended to cover all such modifications and changes as fall within the true spirit of the invention. All U.S. patents cited herein are incorporated herein by reference.

What is claimed is:

1. A method for the preparation of a solid polymeric phosphate with a molecular weight of at least about 1500 and a softening temperature of at least about 10° C. comprising the steps of:

a. reacting a phosphorus oxyhalide with a monohydroxyaromatic compound to form a monoaryldihalophosphate;

b. removing substantially all of any remaining phosphorus oxyhalide;

c. reacting the monoaryldichlorophosphate product with a dihydroxyaromatic compound; and d. reacting the product of step (c) with a monohydroxyaromatic compound wherein the polymer thus formed is a solid with a linear structure and with less than 10 ppm halogen bound to phosphorus.

2. The method of claim 1 wherein the phosphorus oxyhalide is phosphorus oxychloride.

3. The method of claim 2 wherein the temperature of the reaction between phosphorus oxychloride and the monohydroxyaromatic compound is in a range from about 100° C. to about 200° C.

4. The method of claim 1 wherein the monohydroxyaromatic compound is at least one substituted or unsubstituted phenyl compound.

5. The method of claim 1 wherein the monohydroxyaromatic compound is phenol.

6. The method of claim 1 wherein the dihydroxyaromatic compound has the structure HO-D-OH, wherein D is a divalent aromatic radical with the structure of formula:

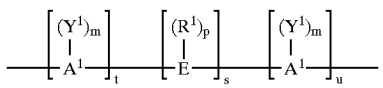

wherein $A^1$ is an aromatic group; E is at least one alkylene, alkylidene, or cycloaliphatic group; a sulfur-containing linkage; a phosphorus-containing linkage; an ether linkage; a carbonyl group; a tertiary nitrogen group; or a silicon-containing linkage; $R^1$ is hydrogen or a monovalent hydrocarbon group; $Y^1$ is selected from the group consisting of hydrogen, a monovalent hydrocarbon group, alkenyl, allyl, halogen, bromine, chlorine; nitro; and OR, wherein R is a monovalent hydrocarbon group; "m" represents any integer from and including zero through the number of positions on $A^1$ available for substitution; "p" represents an integer from and including zero through the number of positions on E available for substitution; "t" represents an integer equal to at least one; "s" is either zero or one; and "u" represents any integer including zero.

7. The method of claim 6 wherein the dihydroxyaromatic compound is at least one member selected from the group consisting of 4,4'-(3,3,5-trimethylcyclohexylidene) diphenol; 4,4'-bis(3,5-dimethyl)diphenol, 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl)methane; bis(4-hydroxyphenyl) methane; bis(4-hydroxy-5-nitrophenyl)methane; bis(4-hydroxy-2,6-dimethyl-3-methoxyphenyl)methane; 1,1-bis (4-hydroxyphenyl)ethane; 1,1-bis(4-hydroxy-2-chlorophenyl)ethane; 2,2-bis(4-hydroxyphenyl)propane; 2,2-bis(3-phenyl-4-hydroxyphenyl)propane; 2,2-bis(4-hydroxy-3-methylphenyl)propane; 2,2-bis(4-hydroxy-3- ethylphenyl)propane; 2,2-bis(4-hydroxy-3-isopropylphenyl) propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; 2,6-dihydroxynaphthalene; hydroquinone; resorcinol; a $C_{1-3}$ alkyl-substituted resorcinol; 2,2-bis-(4-hydroxyphenyl)-butane; 2,2-bis-(4-hydroxyphenyl)-2-methylbutane; 1,1-bis-(4-hydroxyphenyl)-cyclohexane; bis-(4-hydroxyphenyl); bis-(4-hydroxyphenyl)-sulphide; 2-(3-methyl-4-hydroxyphenyl-2-(4-hydroxyphenyl)-propane; 2-(3,5-dimethyl-4-hydroxyphenyl)-2-(4-hydroxyphenyl)-propane; 2-(3-methyl-4-hydroxyphenyl)-2-(3,5-dimethyl-4-hydroxyphenyl)-propane; bis-(3,5-dimethylphenyl-4-hydroxyphenyl)methane; 1,1-bis-(3,5-dimethylphenyl-4-hydroxyphenyl)ethane; 2,2-bis-(3,5-dimethylphenyl-4-hydroxyphenyl)propane; 2,4-bis-(3,5-dimethylphenyl-4-hydroxyphenyl)-2-methyl-butane; 3,3-bis-(3,5-dimethylphenyl-4-hydroxyphenyl)pentane; 1,1-bis-(3,5-dimethylphenyl-4-hydroxyphenyl)cyclopentane; 1,1-bis-(3,5-dimethylphenyl-4-hydroxyphenyl)cyclohexane; bis-(3.5-dimethylphenyl-4-hydroxyphenyl)-sulphide. 3-(4-hydroxyphenyl)-1,1,3-trimethylindan-5-ol, 1-(4-hydroxyphenyl)-1,3,3-trimethylindan-5-ol; and 2,2,2',2'-tetrahydro-3,3,3',3'-tetramethyl-1,1'-spirobi[1H-indene]-6, 6'-diol.

8. The method of claim 7 wherein the dihydroxyaromatic compound is bisphenol A.

9. The method of claim 1 wherein the reaction of step (c) is conducted in the presence of at least one acid acceptor.

10. The method of claim 1 wherein the acid acceptor is at least one tertiary amine.

11. The method of claim 10 wherein the tertiary amine is selected from triethylamine, dimethylbutylamine, diisopropylethylamine, 2,2,6,6-tetramethylpiperidine, alkanolamines, ethanolamine and diethanolamine.

12. The method of claim 1 wherein the reaction of step (c) is conducted in a solvent.

13. The method of claim 12 wherein the solvent is selected from the group consisting of ethers, diethyl ether, diisopropyl ether, dibutyl ether, anisole, tetrahydrofuran; ketones, acetone methyl ethyl ketone, chlorinated hydrocarbons, methylene chloride, trichloroethylene, alcohols, and diols.

14. The method of claim 1 wherein the reaction of step (c) is conducted in the presence of a catalyst.

15. The method of claim 12 wherein the catalyst is selected from aluminum chloride and magnesium chloride.

16. The method of claim 1 wherein the reaction of step (c) is conducted in the melt.

17. A flame retardant resin composition comprising the solid polymeric phosphate made by the method of claim 1.

18. The resin composition of claim 17, wherein said resin is selected from the group consisting of thermoset resins, thermoplastic resins, condensation polymers and addition polymers.

19. The resin composition of claim 18, wherein said resin is a thermoplastic resin.

20. The resin composition of claim 19, wherein said thermoplastic resin is selected from the group consisting of polyesters, polycarbonates, bisphenol A polycarbonate, polyamides, polyimides, polyamideimides, polystyrenes, rubber-modified polystyrenes, acrylonitrile-containing polymers, polyarylene ethers, poly(2,6-dimethyl-1, 4phenylene ether) and combinations thereof and wherein said solid polymeric phosphate is present in said resin composition in an amount from about 1 percent by weight to about 30 percent by weight.

21. The resin composition of claim 20 wherein the solid polymeric phosphate does not show any surface migration at temperatures at which the resin composition is processed.

22. A method for the preparation of a polymeric phosphate flame retardant with a molecular weight of at least about 1500 and a softening temperature of at least about 10° C. comprising the steps of:

a. reacting phosphorus oxychloride with a monohydroxyaromatic compound of the formula

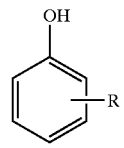

wherein R is selected from $C_1$ to $C_{30}$ alkyl, chlorine and bromine;

b. removing substantially all of any remaining phosphorus oxychloride;

c. reacting the monoaryldichlorophosphate product with a dihydroxyaromatic compound; and d. reacting the product of step (c) with phenol, wherein the polymer thus formed is a solid with a linear structure and less than 10 ppm halogen bound to phosphorus.

23. The method of claim 22 wherein the monohydroxyaromatic compound is phenol.

24. The method of claim 23 wherein the temperature of reaction between phosphorus oxychloride and phenol is between 100° C. and 200° C.

25. The method of claim 22 wherein the dihydroxyaromatic compound is at least one compound of the formula

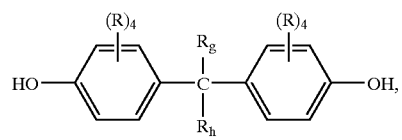

where independently each R is hydrogen, chlorine, bromine or a $C_{1-30}$ monovalent hydrocarbon or hydrocarbonoxy group, and independently $R_g$ and $R_h$ are hydrogen or a $C_{1-30}$ monovalent hydrocarbon group.

26. The method of claim 22 wherein the reaction of step (c) is conducted in the presence of at least one acid acceptor which is a tertiary amine.

27. The method of claim 26 wherein the tertiary amine is selected from dimethylbutylamine, diisopropylethylamine, 2,2,6,6-tetramethylpiperidine, alkanolamines, ethanolamine and diethanolamine.

28. The method of claim 22 wherein the reaction of step (c) is conducted in a solvent.

29. The method of claim 28 wherein the solvent is selected from the group consisting of ethers, diethyl ether, diisopropyl ether, dibutyl ether, anisole, tetrahydrofuran; ketones, acetone methyl ethyl ketone, chlorinated hydrocarbons, methylene chloride, trichloroethylene, alcohols, and diols.

30. The method of claim 22 wherein the reaction of step (c) is conducted in the melt in the presence of a catalyst, the catalyst being selected from aluminum chloride and magnesium chloride.

31. The method of claim 22 wherein the polymer has the formula:

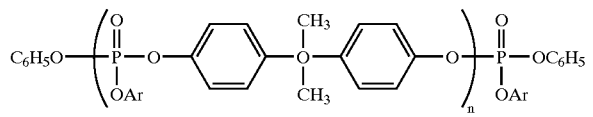

wherein n is an integer greater than or equal to about 2; and Ar is a residue derived from a monohydroxyaromatic compound.

32. The method of claim 31 wherein the monohydroxyaromatic compound is phenol.

33. A flame retardant thermoplastic resin composition comprising the solid polymer made by the method of claim 22.

34. Thermoplastic resin compositions comprising the solid polymeric phosphate of made by the method claim 32, wherein said thermoplastic resin is selected from the group consisting of polyesters, polycarbonates, bisphenol A polycarbonate, polyamides, polyimides, polyamideimides, polystyrenes, rubber-modified polystyrenes, acrylonitrile-containing polymers, polyarylene ethers, poly(2,6-dimethyl-1,4-phenylene ether) and combinations thereof; and wherein said solid polymeric phosphate is present in said resin composition in an amount from about 1 percent by weight to about 30 percent by weight.

35. The thermoplastic resin composition of claim 34 wherein the resin is poly(ethylene terephthalate).

36. The resin composition of claim 35 wherein the solid polymeric phosphate does not show any surface migration at temperatures at which the resin composition is processed.

* * * * *